United States Patent Office 3,062,794
Patented Nov. 6, 1962

3,062,794
1,1,2,3-TETRAFLUOROBUTADIENE, ITS PREPARATION, AND HOMOPOLYMERS AND COPOLYMERS THEREOF
Hyman Iserson, Erdenheim, Pa., Francis E. Lawlor, Wilmington, Calif., and Murray Hauptschein, Glenside, Pa., assignors to Pennsalt Chemicals Corporation, Philadelphia, Pa., a corporation of Pennsylvania
No Drawing. Filed Mar. 23, 1959, Ser. No. 800,966
18 Claims. (Cl. 260—87.5)

This invention relates to the diene 1,1,2,3-tetrafluoro-1,3-butadiene, $CF_2=CF-CF=CH_2$, and homopolymers and copolymers prepared therefrom.

A number of fluorinated butadienes are known. These compounds are known to differ widely both in their ability to polymerize to form useful polymers and in the properties of the polymers produced. These differences arise not only from the degree of fluorination but also from the presence of substituent groups such as chlorine, methyl, trifluoromethyl etc. and upon the distribution of the fluorine throughout the molecule. Thus, isomeric structures, differing only in the relative position of the fluorine atoms display wide differences with both respect to ease of polymerization and the properties of the polymers produced.

Thus, a number of the fluorinated dienes, particularly those with a substantial proportion of fluorine such as hexafluorobutadiene $CF_2=CF-CF=CF_2$, 1,1,2,4,4-pentafluorobutadiene-1,3, $CF_2=CF-CH=CF_2$; 4-methyl-1,1,2-trifluorobutadiene-1,3

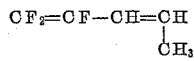
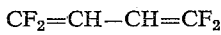

and 1,1,4,4-tetrafluoro-1,3-butadiene, $$CF_2=CH-CH=CF_2$$

are known to polymerize with difficulty and/or in poor yields which makes the production of useful polymers from such fluorobutadienes expensive or impracticable. For example, the polymerization of hexafluorobutadiene to high molecular weight polymers required extremely high pressures of the order 225,000 lbs./in.$^2$ as reported by Slesser and Schram, "Preparation Properties and Technology of Fluorine and Organic Fluoro Compounds," McGraw-Hill, 1951, pp. 625–626.

Other fluorobutadienes, particularly those with a limited amount of fluorine, such as 1,1-difluorobutadiene-1,3 $CF_2=CH-CH=CH_2$ are known to polymerize with relative ease to form polymers which in some cases have elastomeric properties. Because most of the molecule is hydrocarbon, however, such low fluorine content butadienes display properties which are closer to those characteristic of hydrocarbons than to the exceptional chemical stability properties characteristic of perfluoro or highly fluorinated materials.

In accordance with the present invention it has been found that the fluorinated butadiene 1,1,2,3-tetrafluorobutadiene-1,3, which has never been previously prepared, is unique among the fluorinated butadienes in that, although having a high proportion of fluorine, it polymerizes with ease to high molecular weight polymers having excellent elastomeric properties and other outstanding properties including high melting point, high decomposition temperature, excellent resistance to attack by solvent and other chemical reagents, and good low temperature properties.

PREPARATION OF 1,1,2,3-TETRAFLOROBUTADIENE-1,3

While a considerable number of methods have been suggested in the past for preparing fluorinated dienes, such as the method suggested in U.S. 2,750,431 of Tarrant et al., it has not been found possible to prepare the fluorodiene $CF_2=CF-CF=CH_2$ by these prior methods. In accordance with the invention, however, it has been found that this diene may be prepared by dehalogenation of the iodide $CF_2ClCFClCF_2CH_2I$ (which itself is a new compound). Loss of the two chlorines, the iodine atom, and an adjacent fluorine, produces the desired diene $$CF_2=CF-CF=CH_2$$

The intermediate iodide $CF_2ClCFClCF_2CH_2I$ may be prepared by reacting the p-toluenesulfonic acid derivative of the corresponding alcohol ($CF_2ClCFClCF_2CH_2OH$) with an alkali metal iodide. The alcohol $$CF_2ClCFClCF_2CH_2OH$$

in turn may be derived, for example, by the reduction of the corresponding acid $CF_2ClCFClCF_2COOH$, or an ester thereof. A typical reaction scheme is shown by the following equations:

(1) 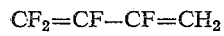

(2) 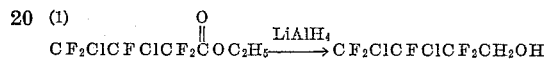
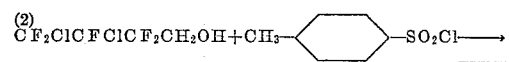

(3) 
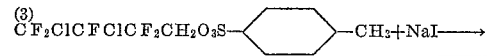

(4) 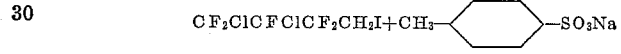

In Equation 1, instead of the ethyl ester, other esters, or the acid, may be employed as starting materials for reduction to the alcohol. The reduction is preferably carried out with lithium aluminum hydride in an anhydrous solvent such as ethyl ether or tetrahydrofurane at −10° C. to the reflux temperature of the solvent. In the course of the reduction, in addition to the alcohol, some aldehyde, $CF_2ClCFClCF_2CHO$, which on exposure to moisture forms the aldhydrol $CF_2ClCFClCF_2CH(OH)_2$, both of which may be further reduced to the alcohol. The aldehyde is generally obtained when the acid is reduced, there usually being no production of aldehyde when the ester is used as a starting material.

The formation of the iodide from the p-toluenesulfonic acid derivative is preferably carried out by heating the derivative in a suitable solvent e.g. a polyethylene glycol, in the presence of an excess of an alkali metal iodide, preferably sodium iodide.

The dehalogenation of the iodide to produce the desired diene (Equation 4) is preferably carried out with the use of an excess of metallic zinc in a suitable medium preferably acetic acid or other mediums such as acetamide, ethanol or dioxane. When using metallic zinc, good conversions are obtained to the desired 1,1,2,3-tetrafluorobutadiene-1,3 along with minor amounts of side products including 3,4-dichloro-1,1-dihydroperfluorobutene-1, $$CF_2ClCFClCF=CH_2$$

and 3,3,3-trihydroperfluoro-1-butene $$CF_2=CFCF_2CH_3$$

The following example illustrates the preparation of the diene $$CF_2=CF-CF=CH_2$$

Example 1

(a) *Preparation of ethyl 3,4-dichloroperflurobutyrate.*— A solution of 400 grams of concentrated sulfuric acid and 325 grams of absolute ethanol is added while stirring and cooling to 865 grams (3.5 moles) of $$CF_2ClCFClCF_2COOH$$

The mixture is stirred at room temperature for two hours, allowed to stand overnight and then refluxed for an additional 2½ hours. The lower oil layer is separated, neutralized with sodium carbonate solution, washed with water and dried over anhydrous magnesium sulfate. On distillation there is obtained 845 grams (88% yield) of the ester $CF_2ClCFClCF_2COOC_2H_5$ having a boiling point of 63 to 65° C. at 20 mm. Hg (middle cut boiling at 64° C. at 20 mm. Hg) and having a refractive index $n_D^{30}$ 1.3694. *Analysis.*—Calculated for $C_6H_5Cl_2F_5O_2$: C, 26.2; H, 1.8; F, 34.5. Found: C, 26.5; H, 1.6; F, 34.0.

(*b*) *Preparation of* $CF_2ClCFClCF_2CH_2OH$.— 413 grams (1.5 moles) of the ester prepared in accordance with (*a*) is dissolved in 200 milliliters of anhydrous ether and added drop by drop at gentle reflux while stirring to 90 grams (95% pure, 2.25 moles) of lithium aluminum hydride in 1600 milliliters of anhydrous ether during 4.5 hours. The mixture is stirred for one additional hour, cooled in an ice bath, and cautiously decomposed by the drop-wise addition of 110 milliliters of water. It is then poured into 1500 milliliters of ice water and neutralized with 12 normal sulfuric acid. The aqueous layer is separated, extracted with ether, and the extract is combined with the organic layer from the reaction mixture. The combined material is washed with water, dried over anhydrous calcium sulfate and distilled. After removal of the ether there is obtained as the principal product 230 grams (66% yield) of the alcohol $CF_2ClCFClCF_2CH_2OH$ having a boiling point of 149° to 150° C. at atmospheric pressure and a refractive index $n_D^{23}$ 1.3792. *Analysis.*—Calculated for $C_4H_3Cl_2F_5O$: C, 20.6; H, 1.3; F, 40.8. Found: C, 20.9; H, 1.3; F, 40.4.

(*c*) *Preparation of 3,4-dichloro-1,1-dihydroperfluorobutyl p-toluenesulfonate.*—A solution of 8.2 grams of sodium hydroxide in 35 milliliters of water is added dropwise to a stirred mixture of 38 grams (0.16 mole) of the alcohol $CF_2ClCFClCF_2CH_2OH$ and 38.1 grams of p-toluene-sulfonyl chloride. The temperature is maintained at 50 to 55° C. during the addition and for 6 additional hours. The oil layer is separated, neutralized with concentrated ammonia, dried and filtered. The filtrate, after being heated at 110° C. at less than 1 mm. Hg weighed 51 grams (82% yield). The p-toluenesulfonate

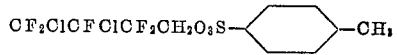

is a colorless liquid having a boiling point of 130 to 131° C. at about 0.3 mm. Hg and a refractive index $n_D^{24}$ 1.4698. *Analysis.*—Calculated for $C_{11}H_9Cl_2F_5O_3S$: C, 34.6; H, 2.2; Cl, 18.4. Found: C, 34.1; H, 2.3; Cl, 18.4.

(*d*) *Preparation of 3,4-dichloro-1,1-dihydro-1-iodoperfluorobutane.*—A solution of 126.5 grams (0.84 mole) of sodium iodide in 400 milliliters of polyethylene glycol is added to 163 grams (0.42 mole) of the p-toluenesulfonate prepared as in (*c*). The mixture is refluxed while stirring for 10 hours. On distillation from the reaction flask at 80 mm. Hg, two layers boiling at 70° to 90° C. are obtained. The upper water-soluble glycol layer is discarded. The lower layer is dried and redistilled to give 78 grams (54% yield) of the iodide $$CF_2ClCFClCF_2CH_2I$$

having a boiling range of 86° to 91.5° C. at 70 mm. Hg (middle cut boiling at 86 to 87° C. at 70 mm. Hg) and having a refractive index $n_D^{25}$ 1.4397. *Analysis.*—Calculated for $C_4H_2Cl_2F_5I$: C, 14.0; H, 0.6; Cl, 20.7; I, 37.0. Found: C, 14.4; H, 0.7; Cl, 21.0; I, 37.4.

(*e*) *Dehalogenation of* $CF_2ClCFClCF_2CH_2I$.— 96 grams (0.28 mole) of the iodide prepared in (*d*) is added slowly to a well stirred refluxing mixture of 325 grams of 30 mesh granular activated zinc, 480 milliliters of glacial acetic acid, and 1 gram of fused zinc chloride. The water cooled condenser is connected at the outlet to a trap cooled in Dry Ice. After the addition is complete, the mixture is refluxed for 7.5 hours. The cold trap contains 35.5 grams of liquid which is rectified in a low temperature, packed Podbielniak column. There is obtained:

(*a*) 19 grams (54% conversion) of $$CF_2=CF-CF=CH_2$$

having a boiling point of −12° C. at 300 mm. Hg. *Analysis.*—Calculated for $C_4H_2F_4$: C, 38.1; H, 1.6; molecular weight 126. Found: C, 38.3; H, 1.8; molecular weight (gas density balance) 126. The structure of this tetrafluorobutadiene is established by its mode of synthesis and is further supported by its infrared spectrum. It has its most intense double bond absorptions at 5.67μ and at 6.05μ. Its absorption at 11.76μ with its typical three peaks, a major peak and two side shoulders, is assigned to the —CH absorption in the =CH$_2$ group and is consistent only with the 1,1,2,3-tetrafluorobutadiene structure.

(*b*) 4.4 grams (11% conversion) of $$CF_2=CF-CF_2-CH_3$$

having a boiling point of 9° C. at 333 mm. Hg. Calculated molecular weight, $C_4H_3F_5$: 146. Found: 146 (gas density balance). This compound has an intense band at 5.59μ in the infrared spectrum.

(*c*) 8.4 grams (15% conversion) of $$CF_2ClCFClCF=CH_2$$

having a boiling point (after refractionation) of 79° C. at 760 mm. Hg and a refractive index $n_D^{19}$ 1.3463. *Analysis.*—Calculated for $C_4H_2Cl_2F_4$: C, 24.4; H, 1.0. Found: C, 24.0; H, 1.3. This compound has a strong band at 5.95μ in the infrared spectrum.

THE HOMOPOLYMER OF $CF_2=CF-CF=CH_2$ 1,1,2,3-tetrafluorobutadiene readily homopolymerizes to form high molecular weight tough elastomeric homopolymers. The polymerization may be carried out with organic or inorganic free-radical producing polymerizatoin catalysts such as benzoyl peroxide, acetyl peroxide, trichloroacetyl peroxide, azodiisobutyronitrile, di-tertiary butyl peroxide, or dipropionyl peroxide; with alkyl peroxides such as diethyl peroxide, or tertiary butyl hydroperoxide; with inorganic peroxides such as barium peroxide, zinc peroxide, or the like which may be used alone or in conjunction with an anhydride of an organic acid; with peroxy acids or their salts, for example persulfuric acid, ammonium persulfate, potassium persulfate, potassium percarbonate, potassium perphosphate, or sodium perborate. Other polymerization catalysts include hydrazine salts, such as hydrazine sulfate, and amine oxides such as trimethylamine oxide.

If desired, buffers may be employed such as sodium pyrophosphate, sodium acid phosphate, sodium bicarbonate, sodium carbonate, or sodium acetate in conjunction with the catalyst particularly where aqueous polymerization media are used.

Promoters may also be employed, if desired, along with the catalyst, such as a reducing agent in conjunction with a peroxy catalyst in a so-called redox polymerization system. Suitable reducing agents include, for example, reduced iron salts such as ferrous ammonium sulfate, sodium sulfite, sodium bisulfite, sodium hydrosulfite, and sodium thiosulfate and the like. If desired, the molecular weight of the polymer may be controlled by addition of regulators such as long chain mercaptans, e.g. tertiary dodecyl mercaptan.

While the amount of catalysts employed is not critical, it should generally be employed in an amount of at least 0.005% based on the weight of the monomer and generally not more than about 5% on the same basis.

Usually, the preferred concentration of the catalyst will range from about 0.01% to 3% by weight based on the total weight of monomer.

The polymerization may be carried out at low pressures, preferably ranging from atmospheric to 1000 lbs./in.$^2$ and more usually from 50 pounds to 500 lbs./in.$^2$, although higher pressures may be employed if desired. Moderate reaction temperatures ranging from —30° C. to 150° C. and more usually from 0° C. to 100° C. are generally suitable when free radical forming polymerization catalysts are used. Reaction time is not critical, longer reaction periods generally favoring higher conversions. Usually, the practicable reaction periods will range from 5 minutes to a day.

If desired, the polymerization may be carried out by exposing the monomer to ultraviolet light, most conveniently at low temperatures e.g. 0° to 100° C. using reaction periods ranging e.g. from one-half to 24 hours.

A preferred polymerization procedure involves polymerization in the presence of water using a freed radical forming catalyst such as potassium persulfate and deoxygenated water, and desirably an emulsifying agent such as sodium lauryl sulfate or a perfluoro or perfluorochloro acid having six or more carbon atoms. This mixture is charged to a reactor after which the monomer is introduced, e.g. by vacuum gaseous transfer, taking care to exclude oxygen, the reactor then being closed and heated with agitation for a reaction period e.g. one-half to 24 hours at a temperature e.g. 0° C. to 100° C. providing a good conversion of the monomer to polymer.

The following examples illustrate the preparation of the homopolymer.

*Example 2*

Twenty parts by weight of deoxygenated water, 0.03 part by weight of potassium persulfate, 0.5 part of sodium lauryl sulfate and 9.8 parts of 1,1,2,3-tetrafluorobutadiene-1,3 are introduced into a pressure reaction vessel which is sealed under vacuum. The vessel and contents is heated at 60° C. for 16½ hours, cooled and vented. The polymer is washed thoroughly with water and dried in a vacuum oven at 60° to 80° C. for 3 hours. The polymer, obtained in 60% conversion, is a strong, white elastomer.

*Example 3*

This example illustrates the polymerization of 1,1,2,3-tetrafluorobutadiene-1,3 by the use of ultraviolet light. 1.43 grams of the diene monomer is introduced into a Vycor tube 9" in length and having an outside diameter of 9 mm. which is then sealed in vacuo. The tube is placed 1" away from an ultraviolet source (Hanovia lamp type S–100) and exposed for 40 hours. The polymer is removed from the tube and placed in a vacuum oven at 85° C. for 3 hours. The polymer product, obtained in 86% conversion is a firm white elastomer.

The polymers obtained as described above are the result essentially of the 1,4-addition polymerization of the monomer as shown by the fact that the only observable band in the C=C stretching vibration region of the infrared spectrum is at 5.8μ. These homopolymers accordingly are made up essentially of repeating

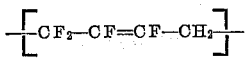

units as distinguished from

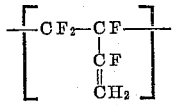

or

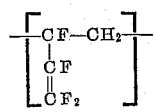

units with their pendant —CF=CH$_2$ or —CF=CF$_2$ units resulting from 1,2 or 3,4-addition polymerization respectively. The lack of any substantial proportion of such pendant groups is highly advantageous since such groups detract considerably from the thermal and chemical stability of the polymer. In the case of repeating

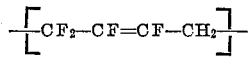

units derived by 1,4-addition, it will be noted that the hydrogens are flanked on each side by fluorine atoms which tend to protect the hydrogens against chemical attack, and the double bond is perfluorinated.

The homopolymers of CF$_2$=CF—CF=CH$_2$ prepared as described above are hight molecular weight polymers as evidenced by their insolubility in organic solvents and by their high melting points. These polymers have melting ranges from 225° C. to 300° C., the melting range being determined by placing a small sample of the elastomer between two glass plates which are in turn placed on a melting point block and heated slowly, maintaining slight pressure on the sample between the two glass plates. The temperature range starting at the temperature at which the first portion of the sample can be observed to turn liquid and ending with the temperature at which the entire sample is liquid is referred to as the melting point range, the lower temperature being referred to as the softening point. As illustrated by the foregoing examples, the diene CF$_2$=CF—CF=CH$_2$ may be polymerized to homopolymers having high softening points under mild polymerization conditions. The preferred homopolymers of the invention are those having softening points of at least 150° C. and especially those having softening points of at least 200° C.

The homopolymers of CF$_2$=CF—CF=CH$_2$ are further characterized by their excellent resistance to organic solvents, the homopolymers prepared in the above examples being substantially insoluble in solvents such as acetone, 1,1,2-trichlorotrifluoroethane, carbon tetrachloride, chloroform, and 2,4-dichlorobenzotrifluoride. The high resistance of the homopolymer to attack by solvents is a highly valuable characteristics and further evidence of the high molecular weight of the polymer.

A further characteristic of the homopolymer of

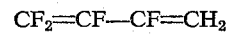

is its excellent thermal stability. The polymers prepared as above described showed no decomposition throughout their melting point range, that is up to about 300° C. The polymers furthermore, have good low temperature properties, retaining their elastomeric properties at temperatures below 0° C. They also show high resistance to attack by chemical reagents in general including for example, to attack by strong acids and alkalis and the like in contrast to hydrocarbon rubbers and less highly fluorinated rubbers.

As pointed out previously, the excellent combination of advantageous properties possessed by the diene 1,1,2,3-tetrafluorobutadiene are not shared by closely related compounds. For example, the compound 1,1,2 trifluoro-3-chloro-butadiene CF$_2$=CF—CCl=CH$_2$, differing from the butadiene of the invention by replacement of the fluorine atom in the 3-position by a chlorine atom produces polymers of much lower melting point and much lower thermal stability than polymers from the tetrafluorobutadiene of the invention. For example, while the homopolymers prepared as described above have a melting point range of from about 225° C. to 300° C., the melting point of a homopolymer of CF$_2$=CF—CCl=CH$_2$ prepared in a similar manner ranges from about 70° to 120° C. Furthermore, while the homopolymers of the tetrafluorobutadiene of the invention are thermally stable up to temperatures of about 300° C., homopolymers of CF$_2$=CF—CCl=CH$_2$ prepared in a similar manner turn amber at 222° C. are dark amber and exhibit bubbling decomposition at 240° C. Furthermore, the homopolymers of $$CF_2=CF-CF=CH_2$$

show greatly increased solvent resistance in contrast to the homopolymers of $CF_2=CF-CCl=CH_2$. While homopolymers from the former diene are substantially insoluble in acetone, carbon tetrachloride, and chloroform, the homopolymers from the latter diene are soluble in acetone and chloroform and swell in carbon tetrachloride. While the homopolymers of $CF_2=CF-CF=CH_2$ are only slightly soluble in hot dimethyl formamide, the homopolymers of $CF_2=CF-CCl=CH_2$ are completely soluble in this solvent at room temperature.

While the homopolymers of $CF_2=CF-CF=CH_2$ are tough, strong elastomers in themselves, their tensile strengths are greatly improved by curing the homopolymer with conventional curing agents used in curing other synthetic rubbers. Suitable curing agents include aliphatic polyamines, sulfur, zinc oxide and peroxide curing agents such as benzoyl peroxide, and dicumyl peroxide. Fillers such as carbon black, silica, etc. may also be milled into the uncured rubber as well as accelerators, and the like, after which the compounded rubber is molded to the desired shape and then heated to curing temperatures ranging for example of 100° C. to 300° C. After curing, the elastomer is, of course, no longer thermoplastic because of the cross-linking that occurs during curing.

The elastomeric copolymers of $CF_2=CF-CF=CH_2$ have many valuable uses because of their unique properties. They are of value, for example, as high temperature rubbers where both high melting point and high scorch temperature is required. They have application for use as gasketing materials, flexible tubing, flexible engine mounts, and the like where resistance to attack by organic solvents and other chemical reagents is required such as in chemical laboratory and chemical process equipment. They are also useful as flexible electrical insulation, particularly where chemical and thermal resistance is of importance.

COPOLYMERS OF $CF_2=CF-CF=CH_2$

As well as forming high molecular weight tough elastomeric homopolymers, the diene $CF_2=CF-CF=CH_2$ likewise forms copolymers having valuable properties with a wide variety of other comonomers. Preferred comonomers are vinylic compounds in which the terminal carbon atom of the vinyl group contains two hydrogen atoms or two fluorine atoms (i.e. vinyl compounds having $CH_2=C<$ or $CF_2=C<$ groups). Included in this group of preferred comonomers are particularly haloethylenes of this type such as $CH_2=CF_2$, $CF_2=CF_2$, $CF_2=CFCl$, $CF_2=CCl_2$, $CF_2=CHCl$, $CF_2=CFH$, $CH_2CHF$ and $CH_2=CHCl$. Also included in this group of vinylic compounds are perfluoroolefins with a terminal double bond such as perfluoropropene, perfluorobutene-1, perfluoroisobutylene and the like, vinyl ethers, such as ethyl vinyl ether trifluoroethyl vinyl ether, acrylates, methacrylates, styrene, acrylonitrile and the like.

Particularly preferred are copolymers with vinylidene fluoride; with tetrafluoroethylene, and with chlorotrifluoroethylene.

Other comonomers that may be polymerized with the diene of the invention include epoxides such as ethylene oxide, particularly the 1,2-epoxides; haloethylenes such as $CFCl=CFCl$, $CHF=CFCl$; internally double bonded olefins such as perfluorobutene-2; and butadienes such as 2-methylbutadiene and halogenated butadienes such as 2-chlorobutadiene and fluoro- or fluorochlorobutadienes.

The copolymerization of $CF_2=CF-CF=CH_2$ with such comonomers may be carried out under the same general polymerization conditions and using generally the same catalysts as described in connection with the homopolymerization of $CF_2=CF-CF=CH_2$. The molar ratio of $CF_2=CF-CF=CH_2$ to the other monomer in the monomer feed may range from 95:5 to 5:95 and in most cases more preferably from 85:15 to 15:85. If desired a mixture of two or more different comonomers may be copolymerized with $CF_2=CF-CF=CH_2$ to form for example a ternary copolymer.

Many of these copolymers are elastomers having valuable properties, such as good low temperature properties and/or good chemical and thermal resistance. Others of lower molecular weight are useful as lubricating oils, hydraulic fluids and plasticizers particularly for halogenated polymers.

Example 4

*Copolymer of $CF_2=CF-CF=CH_2$ and vinylidene fluoride.*—One hundred parts by weight of deoxygenated water, 0.4 part by weight of ammonium perfluorooctanoate and 0.5 part by weight of di-tertiary butyl peroxide are introduced into a 300 ml. 316 stainless steel reaction vessel. The vessel is cooled in liquid nitrogen, evacuated and 26.6 parts by weight of 1,1,2,3-tetrafluoro-1,3-butadiene and 13.3 parts by weight of vinylidene fluoride are charged by gas transfer in vacuo. The vessel and contents are heated at 80° C. for 16 hours. It is then cooled and vented. The resulting copolymer is an elastomer having good low temperature properties.

Example 5

*Copolymer of $CF_2=CF-CF=CH_2$ and trifluoroethyl vinyl ether.*—An avacuated Vycor tube is charged with 1.26 grams (0.01 mole) of 1,1,2,3-tetrafluorobutadiene-1,3 and 1.26 grams (0.01 mole) of $$CF_3CH_2-O-CH=CH_2$$

the tube then being sealed in vacuo, and irradiated by an ultraviolet light source for 40 hours. The tube is then cooled, opened and vented and the polymer removed and heated in a vacuum oven at 70° to 80° C. for 2 hours. The polymer product which is obtained in 60% conversion is a white elastomer having a softening point of from 72° to 80° C. which on analysis is found to contain 38.25% carbon, 56.67% fluorine and 2.01% hydrogen. On the basis of the fluorine analysis, the mole percent trifluoroethyl vinyl ether in the copolymer is 24%. The infrared spectrum shows a major band at 5.8μ and a weak band at 5.93μ in the C=C stretching region which indicates that the copolymerization occurred primarily by 1,4-addition of the diene with some 1,2-addition across the $CF_2=CF-$ bond to leave a pendant $-CF=CH_2$ group.

Example 6

*Copolymer of $CF_2=CF-CF=CH_2$ and tetrafluoroethylene.*—A Vycor tube is charged with 1.33 grams of $CF_2=CF-CF=CH_2$ and 1.18 grams of $CF_2=CF_2$ and is then sealed under vacuum and irradiated by ultraviolet light for 46 hours. The tube is then cooled and vented after which the polymer is removed and heated in a vacuum oven at about 70° C. for 4 hours. The product is a solid containing about 31.5% carbon and about 47.5 mole percent of the tetrafluorobutadiene monomer.

Example 7

*Copolymer of $CF_2=CF-CF=CH_2$ and perfluoropropene.*—A Vycor tube is charged by vacuum gaseous transfer with 1.24 grams of $CF_2=CF-CF=CH_2$ and 1.47 grams of $CF_3CF=CF_2$ after which the tube is sealed under vacuum and exposed to ultraviolet irradiation for 166 hours. The unpolymerized material is vented leaving 0.6 gram of a transparent viscous oil containing 33.9% carbon with about 74 mole percent of tetrafluorobutadiene in the copolymer. This oil is useful as a lubricant, hydraulic fluid, and the like where good resistance to chemical attack is required, and is also useful as a plasticizer especially for fluorine containing, particularly perfluorinated polymers.

Example 8

*Copolymer of $CF_2=CF-CF=CH_2$ and chlorodifluoroethylene.*—A Vycor tube is charged with 1.24 grams of $CF_2=CF-CF=CH_2$ and 1.02 grams of $CF_2=CHCl$, sealed under vacuum, after which it is irradiated by ultraviolet light for 46 hours. It is then vented and the remainder of the volatile contents removed by placing the tube in a vacuum oven at 70 to 80° C. for 4 hours. The polymer product is a transparent, viscous oil which on analysis shows a content of 36.41% carbon and 56.0% fluorine on the basis of which it is determined that the copolymer contains about 85 mole percent of tetrafluorobutadiene. The absorption peaks in the double bond region of the infrared spectrum are at $5.8\mu$ and $5.93\mu$, the $5.8\mu$ band being only slightly more intense than the $5.93\mu$ band.

Example 9

*Copolymer of $CF_2=CF-CF=CH_2$ and ethylene oxide.*—A Vycor tube, 9" in length and having an outside diameter of 9 mm. is charged by vacuum gaseous transfer with 1.28 grams (0.01 mole) of 1,1,2,3-tetrafluorobutadiene-1,3 and 0.48 gram (0.009 mole) of ethylene oxide, and the tube is sealed under vacuum. The tube is placed 1" from an ultraviolet source (Hanovia lamp type S–100) and irradiated for 40 hours. It is then cooled, opened and vented. The contents are removed and heated in a vacuum oven at 80° C. for 2 hours. The polymer product which is obtained in 77% conversion is a white elastomer, slightly soluble in 1,1,2-trichlorotrifluoroethane. It softens and melts at 250° to 270° C. The infrared absorption spectrum shows a major band at $5.8\mu$ showing that the polymerization proceeded predominantly by 1,4-addition and a weak band at $5.93\mu$, indicating a small amount of 1,2-addition across the $CF_2=CF-$ bond. A relatively strong band at $3.45\mu$ ($CH_2$) indicates the presence of $(CH_2CH_2O)_n$ units. The analysis of this copolymer indicating 40.0% carbon corresponds to a mole fraction of 0.73 for the tetrafluorobutadiene in the copolymer.

We claim:
1. 1,1,2,3-tetrafluorobutadiene-1,3.
2. The method for preparing the diene
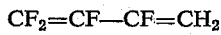
which comprises dehalogenating the compound
in the presence of a dehalogenating metal.
3. The compound $CF_2ClCFClCF_2CH_2I$.
4. Polymeric 1,1,2,3-tetrafluorobutadiene-1,3.
5. Tough, elastomeric homopolymers of 1,1,2,3-tetrafluorobutadiene-1,3.
6. Homopolymers of 1,1,2,3-tetrafluorobutadiene-1,3 containing the recurring unit.
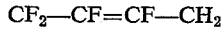
7. The method of polymerizing $CF_2=CF-CF=CH_2$ which comprises heating said diene in the presence of a peroxy polymerization catalyst.
8. The method of polymerizing $CF_2=CF-CF=CH_2$ which comprises exposing said diene to ultraviolet light irradiation.
9. Copolymers of $CF_2=CF-CF=CH_2$ and vinylic compounds free from acetylenic unsaturation.
10. Copolymers of $CF_2=CF-CF=CH_2$ and vinylic compounds free from acetylenic unsaturation in which the vinyl group is selected from the class consisting of those having two hydrogen atoms on the terminal carbon atom of the vinyl group and those having two fluorine atoms on the terminal carbon atom of the vinyl group.
11. Copolymers of $CF_2=CF-CF=CH_2$ and haloethylenes.
12. Copolymers of $CF_2=CF-CF=CH_2$ and vinylidene fluoride.
13. Copolymers of $CF_2=CF-CF=CH_2$ and tetrafluoroethylene.
14. Copolymers of $CF_2=CF-CF=CH_2$ and perfluoroolefins having a terminal double bond.
15. Copolymers of $CF_2=CF-CF=CH_2$ and perfluoropropene.
16. Copolymers of $CF_2=CF-CF=CH_2$ and
$$CF_3CH_2-O-CH=CH_2.$$
17. Copolymers of $CF_2=CF-CF=CH_2$ and ethylene oxide.
18. Copolymers of $CF_2=CF-CF=CH_2$ and
$$CF_2=CFCl.$$

References Cited in the file of this patent

UNITED STATES PATENTS

| | | |
|---|---|---|
| 2,479,241 | Kolvoort et al. | Aug. 16, 1949 |
| 2,481,044 | Scott | Sept. 6, 1949 |
| 2,743,303 | Anderson | Apr. 24, 1956 |
| 2,842,528 | Herbst et al. | July 8, 1958 |
| 2,856,435 | Lo | Oct. 14, 1958 |
| 2,861,933 | Kern | Nov. 25, 1958 |
| 2,880,152 | Hiltz et al. | Mar. 31, 1959 |
| 2,949,466 | Honn | Aug. 16, 1960 |
| 2,992,211 | Lo et al. | July 11, 1961 |

OTHER REFERENCES

Tarrant et al.: J.A.C.S., 77, pp. 3640–44 (1955).

UNITED STATES PATENT OFFICE
CERTIFICATE OF CORRECTION

Patent No. 3,062,794                November 6, 1962

Hyman Iserson et al.

It is hereby certified that error appears in the above numbered patent requiring correction and that the said Letters Patent should read as corrected below.

Column 1, line 67, for "-TETRAFLOROBUTA-" read -- -TETRAFLUOROBUTA- --; column 2, line 71, for "-dichloroperflurobutyrate", in italics, read -- -dichloroperfluorobutyrate --, in italics; column 4, lines 43 and 44, for "polymerizatoin" read -- polymerization --; column 5, line 20, for "freed" read -- free --; column 6, line 15, for "hight" read -- high --; column 7, line 56, for "CH$_2$CHF" read -- CH$_2$=CHF --; column 8, line 30, for "avacuated" read -- evacuated --; column 10, line 5, the formula should appear as shown below instead of as in the patent:

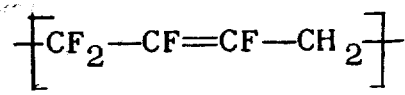

Signed and sealed this 9th day of April 1963.

(SEAL)
Attest:

ESTON G. JOHNSON
Attesting Officer

DAVID L. LADD
Commissioner of Patents